Figure 1:
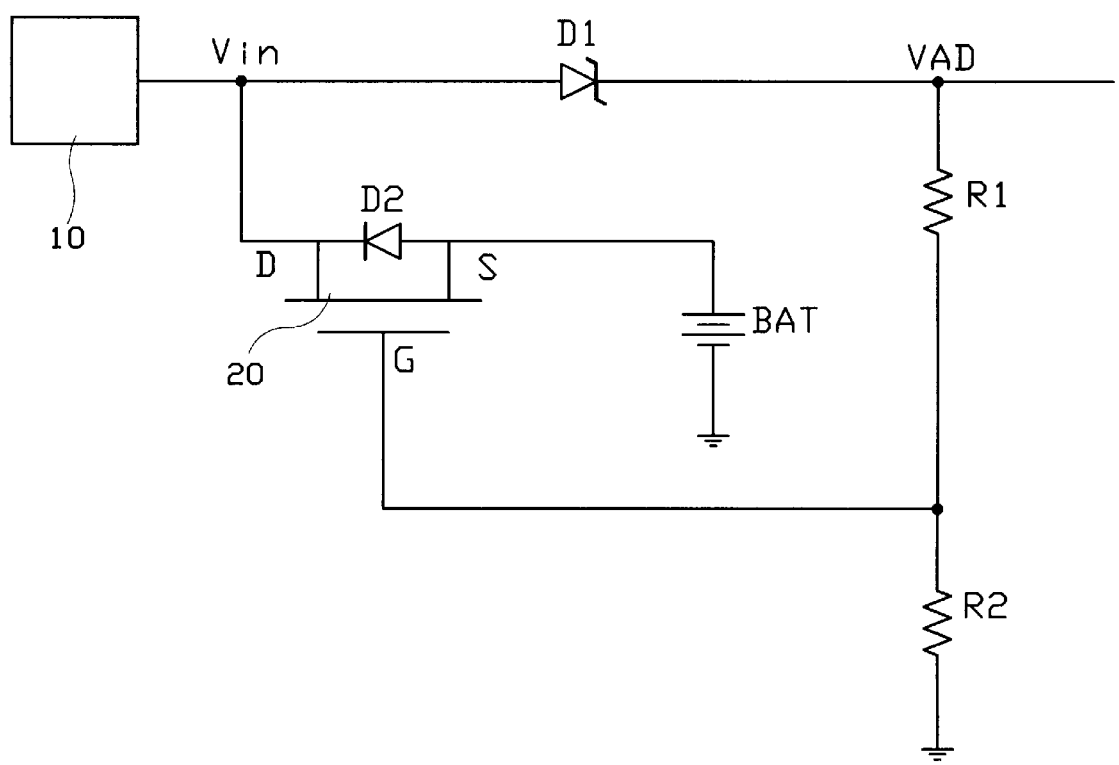

United States Patent [19]
Yeh

[11] Patent Number: 5,962,936
[45] Date of Patent: Oct. 5, 1999

[54] POWER SUPPLY DEVICE FOR LCD BACKLIGHT CONVERTER

[75] Inventor: Henry Yeh, Chung-Li, Taiwan

[73] Assignee: Twinhead International Corp., Taiwan

[21] Appl. No.: 08/955,205

[22] Filed: Oct. 21, 1997

[51] Int. Cl.[6] .................................................. H01H 83/12
[52] U.S. Cl. ............................ 307/130; 361/88; 345/102
[58] Field of Search ..................................... 307/130, 125, 307/64, 66, 80, 44, 85, 86, 52, 31; 301/88; 345/102

[56] References Cited

U.S. PATENT DOCUMENTS

| | | | |
|---|---|---|---|
| 4,427,899 | 1/1984 | Bruns | 307/66 |
| 4,528,459 | 7/1985 | Wiegel | 307/86 |
| 4,709,200 | 11/1987 | Ochiai | 307/64 |
| 4,788,450 | 11/1988 | Wagner | 307/64 |

*Primary Examiner*—Albert W. Paladini
*Attorney, Agent, or Firm*—Proskauer Rose LLP

[57] ABSTRACT

Disclosed is a power supply device for LCD backlight converter in which a Zener diode is placed between an input of power adapter and an input of backlight converter, and a p-type MOSFET is placed between the power adapter and a cell to be used as a switch. When the power adapter provides power, the voltage level of the power is decreased by the Zener diode. When the cell provides power, the power provided to backlight converter is approximately equal to the power stored in the cell. The ratio of the input voltage of power adapter to the input voltage of the cell is decreased to extend supplying period of the cell.

2 Claims, 1 Drawing Sheet

POWER SUPPLY DEVICE FOR LCD BACKLIGHT CONVERTER

FIELD OF THE INVENTION

This invention relates to a power supply device for LCD backlight converter, particularly to a device which can reduce the ratio of input voltage of power adapter to input voltage of a battery so as to extend the supply period of the cell.

BACKGROUND OF THE INVENTION

Generally, a notebook computer utilizes LCD(Liquid Crystal Display) as a display device. The LCD does not provide light source by itself. Light must be provided by a backlight module which contains a special gas which radiates light when actuated by high voltage of high frequency which is generated by means of a backlight converter, such as DC/AC converter, in order to allow the LCD emit light to display message. For the notebook computer, the power may be supplied either by an AC/DC adapter or an electrical cell. In case of AC/DC adapter, AC voltage is converted into DC voltage without any time limitation. However, if the cell is used, its use is limited in view of using life because the charging capacity of a cell is limited so that the cell cannot provide a long-term power to the notebook computer. To solve the above problem, most of the computer manufacturers intend to use cells having longer life, but they did not found out the other main factor which affects the life of cell and which cannot extend the using life of cell, i.e. the efficiency of converter is low.

A problem is encountered upon designing high efficiency converters. If the problem cannot be solved, the desired aim of excellent efficiency and low cost cannot be achieved. The problem is that the working range of input power voltage of the converter cannot be too broad. The efficiency of the converter is determined by the equation $|Vmax/Vmin|<=N$ (some manufacturers may set N to be 2). From the forgoings, it is known that for the notebook computer, two kinds of power supply modes, including AC/DC adapter and cell, may be used. Because the AC/DC adapter is the charging device for providing power to rechargeable cell, the voltage level of the input of AC/DC adapter should be higher than the maximum voltage level of the rechargeable cell, i.e. Vmax. Vmin is the minimum level at which the cell can discharge. Under this condition, $|Vmax/Vmin|>=2$, and the ideal ratio N cannot be obtained. If the ratio N is to be lowered, an additional circuit should be designed and added to allow the ratio N to approach ideal value, and therefore the cost of the adapter is increased. The notebook manufacturers still endeavor to increase the using efficiency of converter and to approach the ideal ratio N at the cost of lowest price.

SUMMARY OF THE INVENTION

It is an object of the present invention to provide a power supply device for LCD backlight converter in which a Zener diode or stabilizing circuit is placed between the input of power adapter and the input of backlight converter. A p-type MOSFET is placed between the power adapter and the cell to be used as a switch. When the cell provides power, the power provided to backlight converter is approximately equal to the power stored in the cell. The ratio of the input voltage of power adapter to the input voltage of the cell is decreased to extend supplying period of the cell.

BRIEF DESCRIPTIONS OF THE INVENTION

FIG. 1 is a schematic view of the circuit of the present invention.

DETAILED DESCRIPTIONS OF THE INVENTION

Please see FIG. 1 which is a schematic view of the circuit of the present invention. A Zener diode D1 is connected between the input VAD of the power adapter and the input Vin of the power converter. Two divider resistors R1 and R2 connected in series are coupled to the input VAD of the power adapter. The positive pole of the cell BAT is connected to the positive pole of a diode D2. The negative pole of the diode D2 is connected to the input Vin of the backlight converter 10. The diode D2 is used as a protector to prevent the input voltage VAD of the power adapter from directly charging the cell BAT and from destroying the cell BAT. The positive and negative poles of the diodes D2 are respectively connected to the source(S) and drain(D) of the p-type MOSFET 20. The gate of the p-type MOSFET 20 is coupled to the node between the divider resistors R1 and R2.

When the power supply used by the notebook computer is from the power adapter, the power VAD provided by the power supply forms a voltage drop across the divider resistor R2. A voltage drop is also present at the gate(G) of the p-type MOSFET 20, therefore, the MOSFET 20 is in cut-off state. If the input voltage Vin which is generated after the voltage VAD of the power adapter drops across the Zener diode D1, is higher than the voltage VBAT of the cell, the diode D2 is in off state. The power of the backlight converter 10 is provided by the power adapter and not by the cell BAT. Although there is a voltage drop across the Zener diode D1, the voltage level of the power supply of the power adapter is higher than the voltage level VBAT of the cell BAT, the Zener diode D1 does not significantly affect the working efficiency. For example, when the power supply of a notebook computer is an AC/DC adaptor, since the supply power VAD induces a voltage decrease on the resistor R2, and further, since voltage decrease is existed on the gate terminal (G) of the p-type MOSFET, the MOSFET is in "OFF" state. At this time, the voltage decrease of the adaptor across the Zener diode D1 is Vin, only if Vin is larger than the voltage of battery VBAT, and the diode D2 will not conduct. As a result, the power of the convertor is supplied from the power convertor. Thus, the Zener diode is used to generate a voltage of fix value.

When the power supply deivce is disconnected and the cell BAT provides electrical power, the voltage VAD does not exist, and across the divider resistor R2 there is no voltage drop. The gate(G) of the p-type MOSFET 20 is grounded, and VGS is the cell voltage VBAT thereby p-type MOSFET 20 being converted into ON state. Because the channel resistance of the p-type MOSFET 20 is very low, the power VBAT of the cell BAT is provided to the backlight converter 10 via the selected route through the p-type MOSFET 20.

As described above, the efficiency of the backlight converter 10 is determined by the equation $|Vmax/Vmin|<=N$. In the present invention, VAD is the Vmax and the VBAT is the Vmin. Because of the arrangement of Zener diode D1, when voltage VAD provides power, the input voltage Vin which provides power to backlight converter 10 from power adapter decreases. As the channel resistance of the p-type MOSFET 20 is so low that there is almost no voltage drop across it. The voltage level VBAT of the cell can provide to the backlight converter 10. Correspondingly, the input voltage Vin of backlight converter 10 is increased when the cell BAT is used. Then, the ratio N can be controlled within a desired range, the using efficiency of the backlight converter 10 increases and the using period of the cell BAT extends.

If a stabilizing circuit can be obtained at reasonable cost, the Zener diode D1 can be replaced by the stabilizing circuit.

The present invention provides a power supply deivce for LCD backlight converter which increases the using efficiency of the backlight converter by adding only a Zener diode at the minimum cost.

While the present invention has been particularly shown and described with reference to these preferred embodiments, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

We claim:

1. A power supply device for an LCD backlight converter, which is connected between the LCD backlight converter and an AC/DC adapter, comprising;

a Zener diode having a first terminal and a second terminal which are respectively coupled to the AC/DC adapter and the backlight converter;

a voltage divider having first and second resistors which are respectively coupled to the first terminal of the Zener diode and ground;

a battery set having a positive pole and a grounded negative pole;

a MOSFET having a source connected to the positive pole, a drain connected to the second terminal, and a gate connected to the voltage divider; and a second diode having a first pole and a second pole which are respectively connected the drain and source of the MOSFET.

2. The power supply device for LCD backlight converter as claimed in claim 1, wherein a stabilizing circuit replaces the Zener diode.

* * * * *